United States Patent [19]
Downey

[11] Patent Number: 5,261,665
[45] Date of Patent: Nov. 16, 1993

[54] GOLF CLUB GRIP FORMED OF A PLURALITY OF MATERIALS AND METHOD OF MANUFACTURE THEREOF

[75] Inventor: Philip Downey, Pomona, Calif.

[73] Assignee: Robert A. Paley, Inc., Pomona, Calif.

[21] Appl. No.: 833,739

[22] Filed: Feb. 11, 1992

[51] Int. Cl.⁵ ............................................. A63B 53/14
[52] U.S. Cl. .............................. 273/81 B; 273/81.4; 74/551.9; 16/DIG. 12
[58] Field of Search .............. 273/81 R, 81.2, 81.3, 273/81.4, 81.5, 81.6, 81 B, 81 C, 81 D, 67 DB, 75, 187.5, 165, 166; 74/551.9; 16/116 R, DIG. 12

[56] References Cited

U.S. PATENT DOCUMENTS

| | | | |
|---|---|---|---|
| 1,139,843 | 5/1915 | Brown | 273/81.6 |
| 1,626,967 | 5/1927 | Reach | 273/81 B |
| 1,994,556 | 3/1935 | Winters | 273/81.3 |
| 2,103,889 | 12/1937 | Brisick | 273/81 B |
| 4,416,166 | 11/1983 | Jannard et al. | 74/551.9 |
| 4,662,415 | 5/1987 | Proutt | 273/165 X |
| 4,819,939 | 4/1989 | Kobayashi | 273/75 X |
| 4,919,420 | 4/1990 | Sato | 273/81 B |
| 4,934,024 | 6/1990 | Sexton | 74/551.9 X |
| 4,953,862 | 9/1990 | Uke et al. | 273/67 DB X |

FOREIGN PATENT DOCUMENTS

| | | |
|---|---|---|
| 953162 | 12/1949 | France ......................... 74/551.9 |
| 2133340 | 7/1984 | United Kingdom . |
| 2182252 | 5/1987 | United Kingdom . |
| 2192550 | 1/1988 | United Kingdom . |
| 2251801 | 7/1992 | United Kingdom . |

OTHER PUBLICATIONS

Kraton Thermpolastic Rubber, Shell Chemical Company Typical Properties, 1986 Catalog.

Primary Examiner—Vincent Millin
Assistant Examiner—Sebastiano Passaniti
Attorney, Agent, or Firm—Charles H. Thomas

[57] ABSTRACT

A golf club grip is formed of a hollow, inner socket and an outer jacket produced from different charges of thermoplastic rubber. The socket and jacket differ in stiffness characteristics, colors, or both stiffness and color. The outer jacket is molded onto the socket and bonded thereto throughout the surfaces of contact therebetween. The torsional stress on the jacket is transmitted to and resisted by the inner socket through the bonding that occurs throughout the interface between the jacket and the socket. Preferably, the socket has an inner socket core portion with a plurality of radially projecting protrusions. The structure of the jacket laterally surrounds the protrusions so that the outermost surfaces of the protrusions are exposed. The golf club grip is produced from a pair of identical mounting cores which are rotated between a pair of molding dies. The sockets are first produced on one mounting core in a first die, and the first mounting core with the socket thereon is cyclically moved into the second die. While the jacket of the golf club grip of the invention is being molded onto the socket just produced in the first die, a new socket is concurrently produced on the second mounting core, which has been moved into the first die.

10 Claims, 4 Drawing Sheets

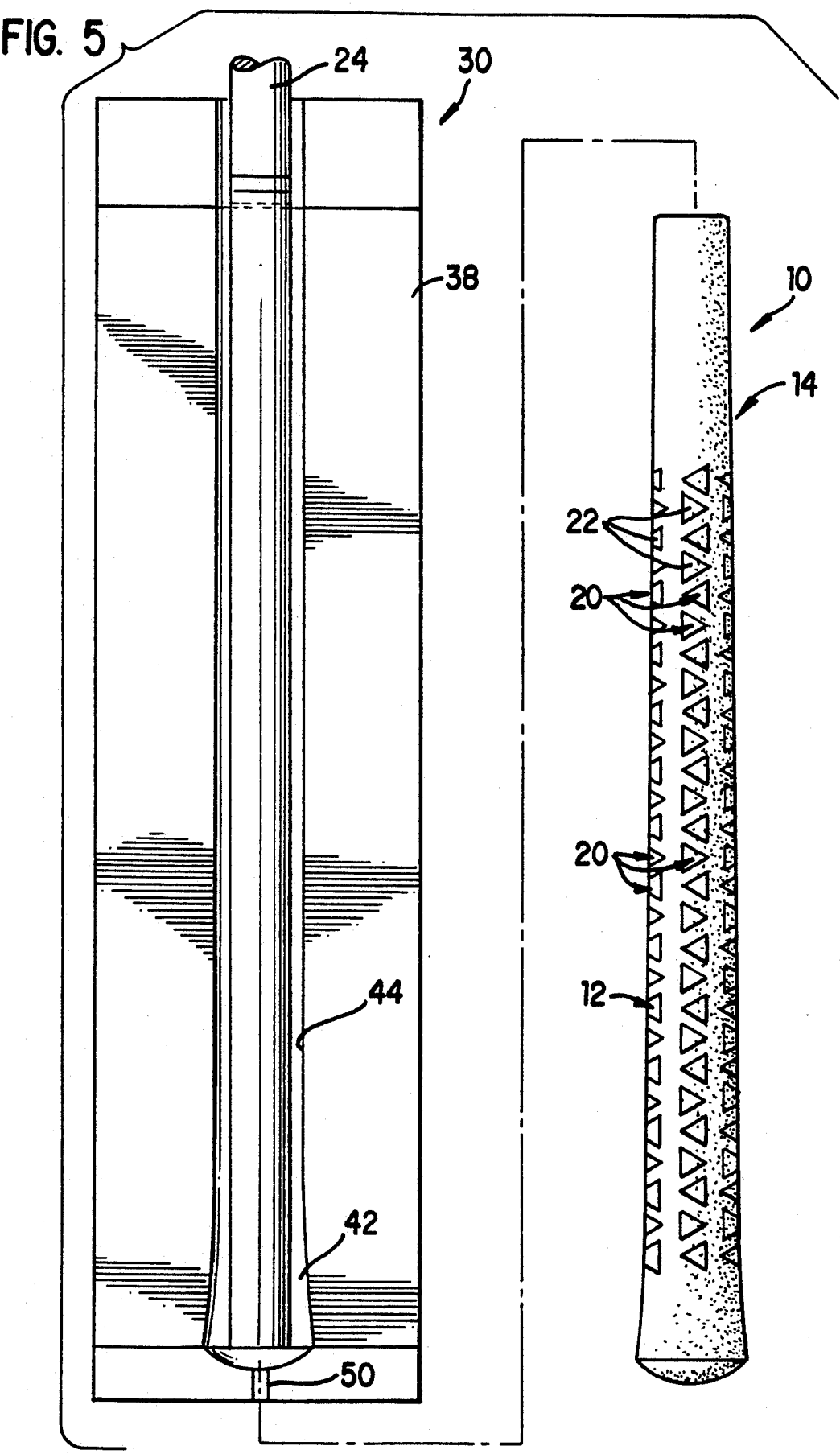

GOLF CLUB GRIP FORMED OF A PLURALITY OF MATERIALS AND METHOD OF MANUFACTURE THEREOF

BACKGROUND OF THE INVENTION

1. Field of the Invention

The present invention relates to an improved grip especially adapted for use on golf clubs and a method of manufacturing golf club grips.

2. Description of the Prior Art

Grips having a wide variety of different construction have been fabricated for use as golf club grips over the years. The shaft of a golf club is an elongated, narrow cylindrical structure which may be formed of solid wood, a solid metal rod, or hollow metal tubing which may be a composite formed of carbon graphite or steel. The extremity of the shaft of the golf club which is held by a golfer is typically quite narrow, usually no more than about five eighths of an inch in diameter at the most. The golf club shaft is normally quite smooth, so that a grip of some type is essential to allow the golfer to control the swing of the club.

Golf club grips having a wide variety of configurations and structure have been employed over the years. Some golf club grips are formed by strips of some outer material, such as leather, overwound about some packing material to extend along the upper end of the shaft of the club for a distance of about ten to twelve inches. Other golf club grips are formed of a single material secured about the upper extremity of the shaft of the golf club. Still other grips are formed of several different materials, arranged in layers on the end of the shaft of the golf club.

The construction and physical characteristics of a golf club grip are extremely important, since minuscule variations in the physical characteristics of a golf club grip will produce very pronounced effects upon the accuracy of golf shots. One of the physical characteristics which is extremely important in a golf club grip is the stiffness, which is the modulus of elasticity of a material or materials of which the golf club grip is fabricated This parameter is extremely important due to the torsional forces which are exerted on the grip as a golfer executes a swing and strikes a golf ball.

As the golfer holds the golf club grip and brings the golf club through a swing, the golfer's hands exert a torsional force on the structure of the grip which acts essentially tangential to the axis of the golf club shaft. The torsional forces on a golf club grip during execution of a swing are transmitted from the surface of the grip radially inwardly to the structure of the golf club shaft. However, the extent to which these torsional forces are transmitted to the shaft do vary, depending upon the stiffness of the structure of the golf club grip. A very rigid or stiff grip will transmit almost the entire torsional force applied to the grip by the golfer's hands to the golf club shaft. On the other hand, if the same torsional force is applied to a very soft grip, much of the torsional movement will be absorbed in the structure of the grip in resiliently deforming the grip within the limits of its elasticity.

A very substantial portion of torsional force applied to a golf club grip fabricated of soft, resiliently deformable materials will be absorbed in twisting the outer surface of the grip relative to the interface between the grip and the golf club shaft. This reduces the amount of torsional force applied to the golf club shaft. Thus, even slight differences in the stiffness characteristics of different golf club grips will affect the extent to which a golf club shaft is rotated about its own axis during execution of a golf swing. These differences are extremely important since the extent to which the club shaft is rotated about its own axis affects the angle at which the generally planar face of the golf club head strikes a golf ball. A very tiny change in the angle of impact of the golf club head against the golf ball results in a very large deviation in the location where the ball ultimately comes to rest.

Another way in which the stiffness of the material of a golf club grip affects the flight of a golf ball resides in the extent to which the torsional force exerted by the hands of the golfer is transmitted to the structure of the grip. The hands of a golfer are much more likely to slip slightly in rotation around the axis of a golf club shaft when the golf club grip employed is very rigid and stiff and has a smooth outer surface. The coefficient of friction between the golfer's hands and such a grip is less than is the case when a golfer employs a grip that is much softer. As a result, a greater portion of torsional force exerted by a golfer's hands on a golf club grip is transmitted to the outer surface of a soft, resilient golf club grip which has lower stiffness characteristics than a more rigid grip. On the other hand, more of the torsional force is absorbed within the structure of such a soft grip itself due to the relatively large degree of resilient deformation of the structure of the grip that occurs during the golf swing.

To maximize the degree of control which a golfer can exert in executing a swing of a golf club, it is desireable for the internal structure of the grip to have a high degree of stiffness, but for the exterior surface of the grip to exhibit a high coefficient of friction. These mutually conflicting characteristics have required golf club grip manufacturers to make compromises which detract from the degree of control of a golf swing achieved by a golfer using conventional golf club grips.

SUMMARY OF THE INVENTION

A principal object of the present invention is to provide a golf club grip in which torsional forces exerted by a golfer's hands are transmitted to a predictable, repeatable extent to the golf club shaft with successive golf strokes. The golf club grip of the invention is a composite structure usually formed of materials of different stiffness characteristics, but united in such a way that a golfer does not experience a variation in the extent of transmission of torsional forces to the golf club shaft that has been characteristic of prior golf club grips.

Another object of the invention is to provide a golf club grip formed of materials often having different stiffness characteristics in which torsional forces that are applied to the outer surface of the grip are transmitted almost completely to the golf club shaft. The high degree to which torsional forces are transmitted to the shaft, and the consistency with which these forces are transmitted, greatly reduces the extent to which variations in torsional force transmission through the structure of the grip affect successive golf strokes. The golf club grip thereby substantially reduces one variable to consistency of a golf swing.

Another object of the invention is to provide a golf club grip in which aesthetic color markings on the grip do not degrade with time. In some conventional golf club grips aesthetic attractiveness is achieved by applying a paint or other coating of a color different from the natural color of the grip structure to selected locations on the exposed surface of the grip. However, with time, and particularly with extensive use of the club during which the outer surface of the grip is subjected to the abrading effects of the golfer's hands in executing a stroke, particles of the paint wear off. Painted ornamentation which was once sharp, bright and distinct with time and use, becomes dull, faded and blurry.

Prolonged exposure to the sun of a golf club grip having conventional painted coloring thereon will also result in deterioration of the color markings. The ultraviolet radiation of the sun has a pronounced, adverse effect on conventional painted designs on golf club grips. The unique construction of the grip of the present invention not only achieves the advantages of consistency of transmission of torsional force through the structure of the grip, as previously described, but also allows a golf club grip to be provided with aesthetically pleasing differences in color which will not degrade with either time, use, or exposure.

A further object of the invention is to provide a system for manufacturing the unique golf club grip of the invention quickly and easily and in such a way that grips according to the invention can be produced very rapidly and economically. The method of manufacture according to the invention provides a pair of mounting cores which are moved alternatingly, sequentially, and relatively rapidly, between a pair of dies or molds. As one of the structural components of the grip of the invention is being produced on one of the mounting cores in a first of the dies, a complete golf club grip including the other structural component is concurrently produced on a second of the mounting cores in a second one of the dies.

At the conclusion of fabrication of the first structural component of the grip in the first die and of the molding of a complete grip in the second die, the complete grip is stripped from the mounting core upon which it was formed. The positions of the mounting cores in the dies are thereupon reversed. That is, the second mounting core is moved into the first die and the first mounting core, with the initial structural component of the grip formed thereon, is moved into the second die. This process is then repeated with a complete golf club grip being formed alternatingly on each of the mounting cores as they move cyclically through the second die.

In one broad aspect the present invention may be considered to be a golf club grip comprised of a hollow, inner socket and an outer jacket of a material that is different in some respect than that of the socket. The jacket is molded onto the socket and bonded thereto throughout the surfaces of contact therebetween such that torsional stress on the jacket is transmitted to and resisted by the inner socket.

Preferably, the material of which the socket is formed is stiffer than the material of the jacket. Also, the socket and the jacket are preferably formed in colors which are different from each other. The socket is preferably molded with an inner socket core portion from which a plurality of protrusions project outwardly and terminate at outermost, outwardly facing surfaces. The jacket is molded onto the socket such that the structure of the jacket covers and is bonded to the entire inner socket core portion of the socket. The structure of the jacket also laterally surrounds and is bonded to the protrusions, but does not cover the outwardly facing surfaces of the protrusions. In this manner the outermost surfaces of the protrusions lie exposed.

While different materials may be employed to produce the golf club grip of the invention, the materials of choice to produce both the socket and the jacket molded thereon are thermoplastic rubbers. Preferably, the thermoplastic rubber forming the socket has a greater stiffness then the thermoplastic rubber forming the jacket. Other possible materials used in the fabrication of the golf club grip of the invention include thermoplastics, thermosetting plastics, different rubbers and also metals. In addition, it is also possible to form the jacket of a material stiffer than the socket. Such a construction allows the torsional forces exerted on the outer jacket to be transmitted more uniformly through the surface area of the structure of the socket to the golf club grip shaft. Also, this construction provides for greater shock absorption in the golf swing.

The principles of the invention may also be applied to produce a golf club grip in which different materials are molded together so as to expose selected surfaces of an inner, molded socket through or alongside an outer jacket. To achieve this result the materials forming the socket and the jacket differ in color, though not necessarily in stiffness characteristics. Such a grip may be comprised of a hollow, inner socket core portion from which an outwardly projecting portion protrudes and terminates in an outermost surface. An outer jacket is molded onto the socket and is bonded thereto throughout the surfaces of contact therebetween. Torsional stress on the jacket is transmitted to and resisted by the inner socket. The jacket completely covers the inner core portion and leaves the outermost surface of the outwardly projecting portion exposed. In this way golf club grips can be produced having contrasting colors on their exposed surfaces which will not degrade. The protruding portion of the socket may include discrete, protruding pedestals each surrounded by the structure of the jacket, projecting bands which are visible alongside the exposed surfaces of the jacket, or other configurations.

In another broad aspect the invention may be considered to be a method of manufacturing golf club grips using a pair of identical first and second mounting cores and a pair of first and second dies wherein the first die encompasses less volume than the second die. According to the method of the invention the dies are concurrently opened. One of the first and second mounting cores is moved from the second die into the first die while concurrently and alternatingly the other of the mounting cores is moved from the first die into the second die. The dies are thereupon concurrently closed. An amount of a first molten material is injected into the first die and another amount of a second molten material is concurrently injected into the second die.

The first and second dies are concurrently cooled with the mounting cores therein. As a result, sockets are produced in the first die and completed golf club grips formed of jackets molded onto and bonded to the sockets are produced in the second die. The dies are concurrently opened and completed golf club grips are ejected from the second die. The process is cyclically repeated so that completed golf club grips are produced in the second die in sequential alternation from each of the mounting cores. Concurrently, sockets are sequentially produced alternatingly on the other of the two mounting cores in the first die.

Preferably, the first resin produces a solidified material having a different stiffness than a solidified material produced by the second resin. Preferably, also the first die has a molding surface with a plurality of indentations therein and the second die has smooth walled surfaces. The sockets produced in the first die are thereby formed with protrusions corresponding to these indentations. The outer surfaces of these protrusions on the sockets contact the smooth walled surfaces of the second die when each of the mounting cores is alternatingly moved into the second die and the second die is closed. Since the outer surfaces of the protrusions reside in contact with the wall surfaces of the second mold, the second molten resin cannot cover the outer surfaces of the protrusions. Rather, it flows around and bonds to the sides of the protrusions, as well as to the inner socket core of the socket from which the protrusions extend.

The protrusions are spaced periodically throughout the surface of the socket core, so that the stiffer structures of the protrusions within the confines of the surrounding jacket add stiffness and rigidity to the outer portion of the golf club grip. Nevertheless, the structure of the softer jacket which laterally surrounds the protrusions provides a high coefficient of friction relative to a golfer's hands when the golf club grip is grasped during a golfing stroke.

A further feature of the preferred embodiment of the invention is that since the stiffer socket protrusions extend radially outwardly coextensively with the jacket, they enhance frictional engagement with the golfer's hands due to the fact that considerable pressure is exerted against them when the golfer grasps the grip. This occurs because the structure of the jacket is compressed radially inwardly alongside the protrusions as they are gripped by the golfer's hands. The relatively incompressible protrusions thereby project outwardly slightly relative to and alongside the compressed jacket material, so that greater frictional contact is established between the stiffer, projecting protrusions and the golfer's hands than would otherwise occur.

The invention may be described with greater clarity and particularity by reference to the accompanying drawings.

DESCRIPTION OF THE DRAWINGS

FIG. 5 is an elevational view of one half of a second die and a mounting core therein showing a completed golf club grip ejected therefrom.

FIG. 8 is a top plan view showing the molding apparatus in which the golf club grip of FIG. 1 is formed.

DESCRIPTION OF THE EMBODIMENT AND IMPLEMENTATION OF THE METHOD

Figure 6:
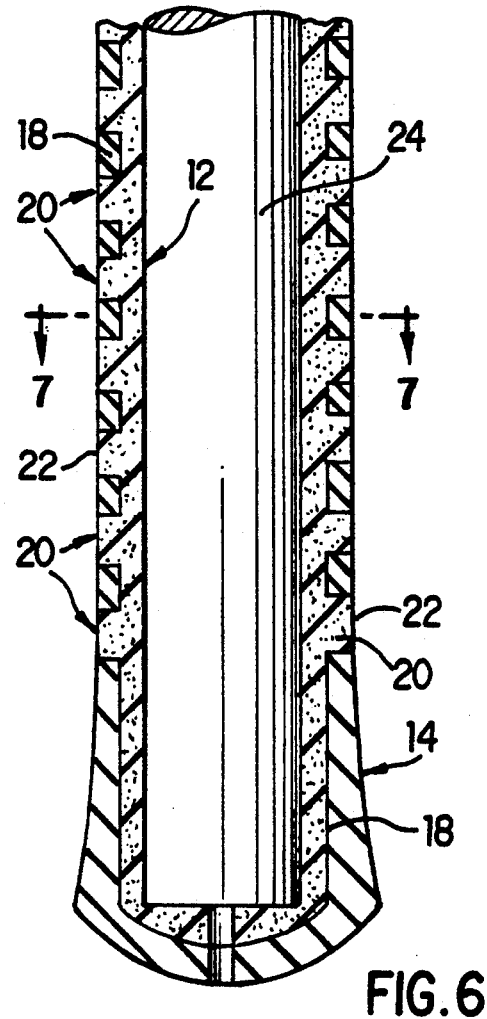
FIG. 6 is a sectional elevational detail of a portion of the completed golf club grip of FIG. 5.
Figure 7:
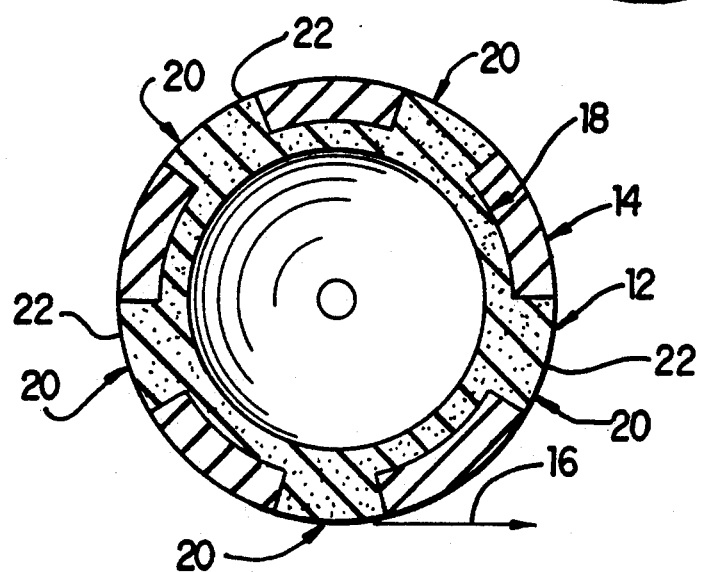
FIG. 7 is a transverse sectional detail taken along the lines 7—7 of FIG. 1.

FIGS. 1 and 5-7 illustrate a completed golf club grip 10 constructed according to the invention. The golf club grip 10 is comprised of a hollow, inner tubular socket 12 formed of molded thermoplastic rubber and having a predetermined stiffness characteristic and an outer, annular jacket 14 also formed of molded thermoplastic rubber and having a predetermined stiffness characteristic that is different than that of the socket 12. The jacket 14 is molded onto the socket 12 as best depicted in FIGS. 6 and 7, and is bonded thereto throughout the surfaces of contact therebetween such that torsional stress on the jacket 14, indicated by the directional arrow 16 in FIG. 7, is transmitted to and resisted by the inner socket 12.

Figure 1:
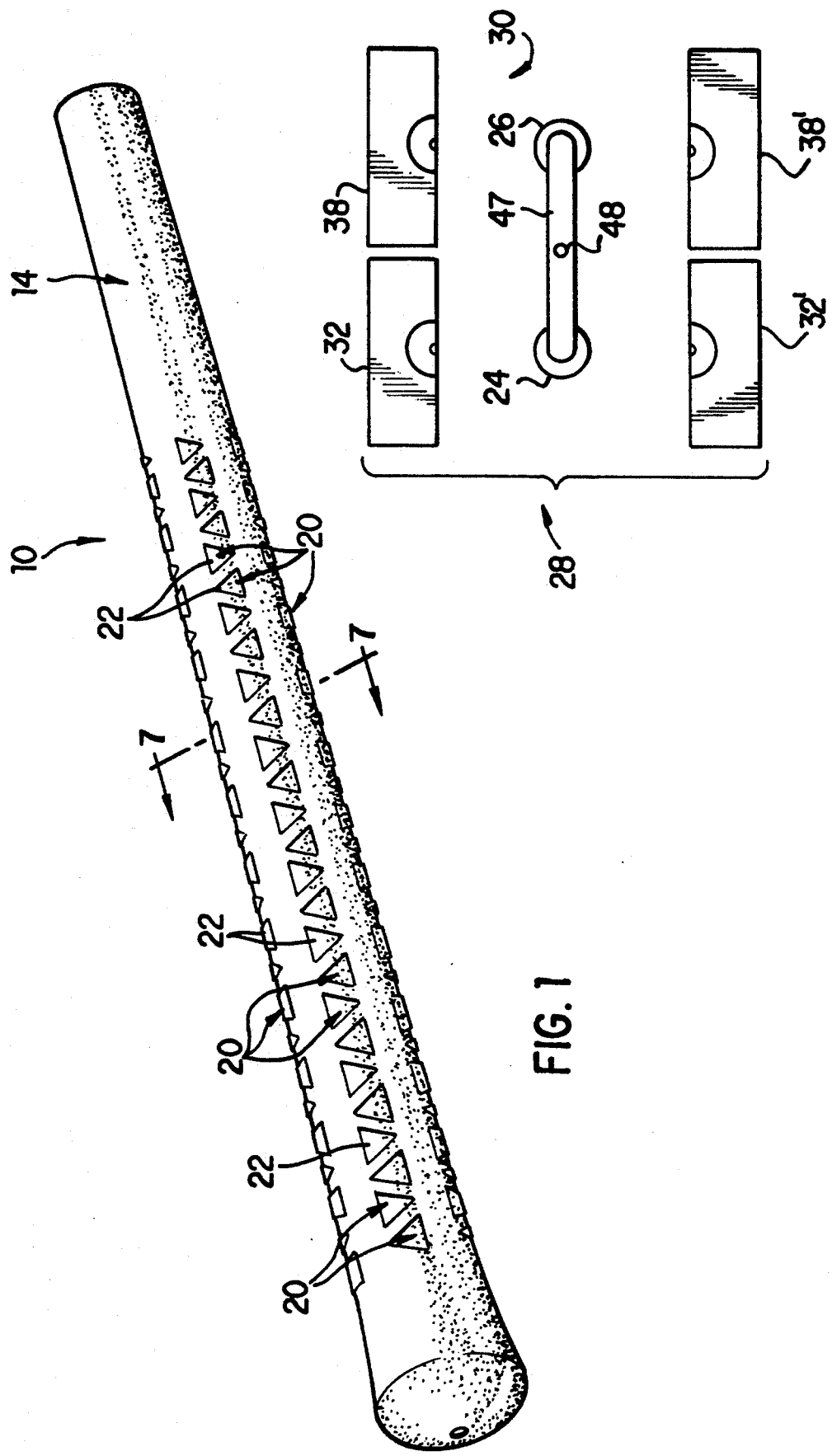
FIG. 1 is a perspective view of a preferred embodiment of a finished golf club grip according to the invention.
Figure 3:
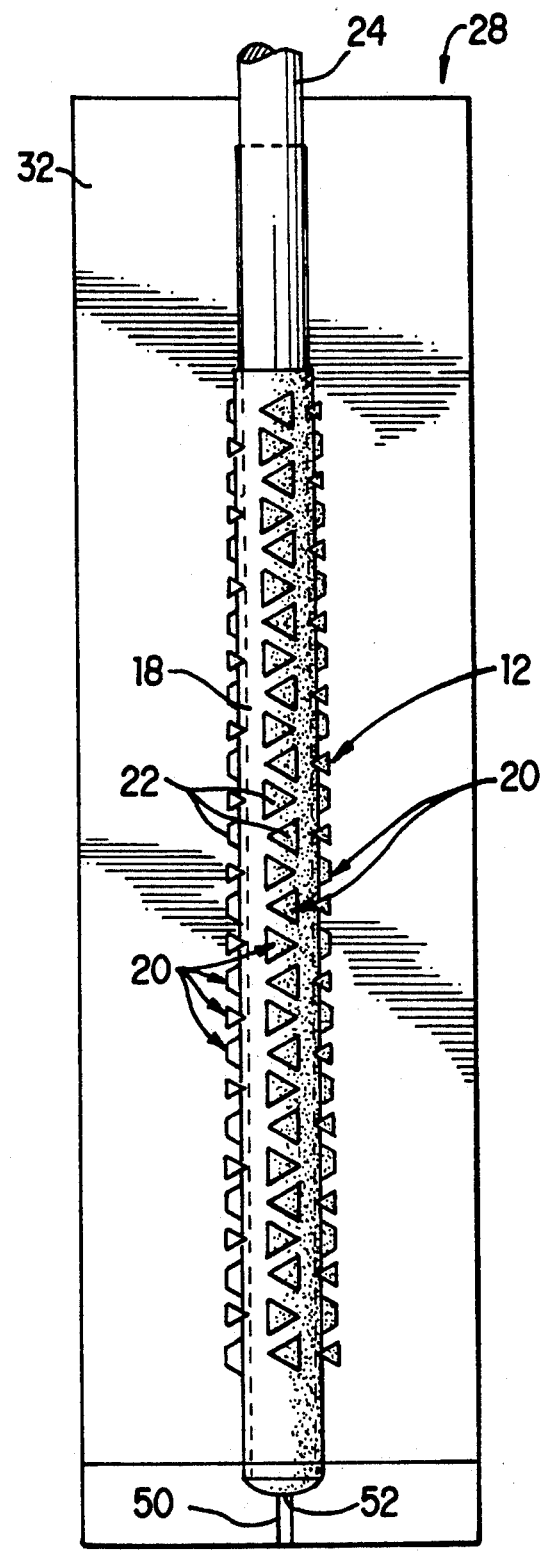
FIG. 3 shows the die of FIG. 2 with one of two identical mounting cores therein and with a golf club grip socket formed thereon.
Figure 4:
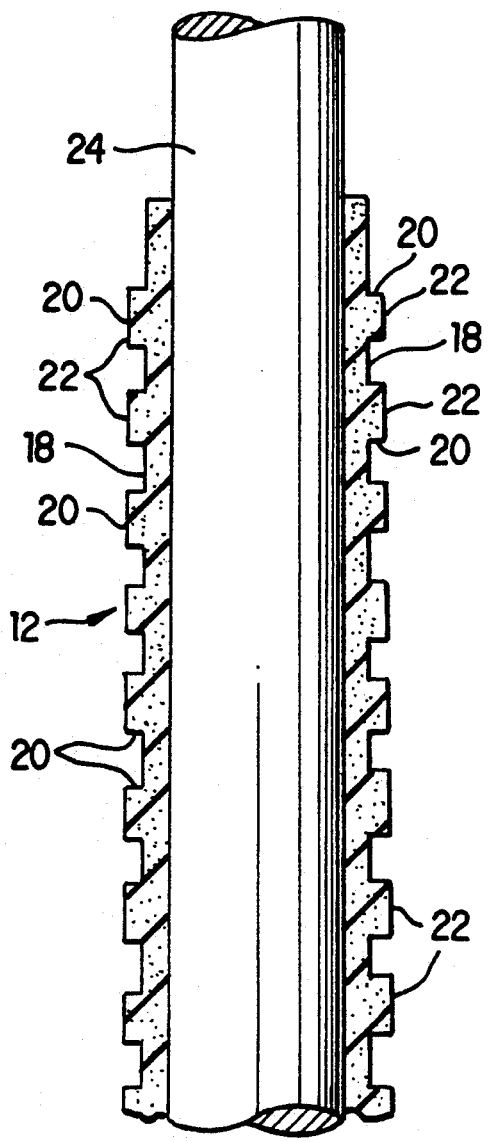
FIG. 4 is a sectional elevational detail of the socket on the mounting core shown in FIG. 3 before it is moved into the second die.

The thermoplastic rubber socket 12 is molded with an annular inner socket core portion 18 from which a plurality of protrusions 20 project radially outwardly at spaced intervals throughout the outer surface of the socket core portion 18, as best depicted in FIGS. 3 and 4. The protrusions 20 are prism-like projections which terminate at outermost surfaces 22. The radially outwardly facing surfaces 22 are curved convex outwardly as shown in FIG. 7 and are of a triangular configuration as illustrated in FIGS. 1 and 5. The thermoplastic rubber jacket 14 is molded onto the socket 12 such that the structure of the jacket covers and is bonded to the inner socket core portion 18 and laterally surrounds and is bonded to the protrusions 20, whereby the outermost surfaces 22 of the protrusions 20 lie exposed. The solidified thermoplastic rubber of which the socket 12 is formed is stiffer then the solidified thermoplastic rubber of the jacket 14. The socket 12 and the jacket 14 are formed of thermoplastic rubbers which have colors that differ from each other.

Figure 2:
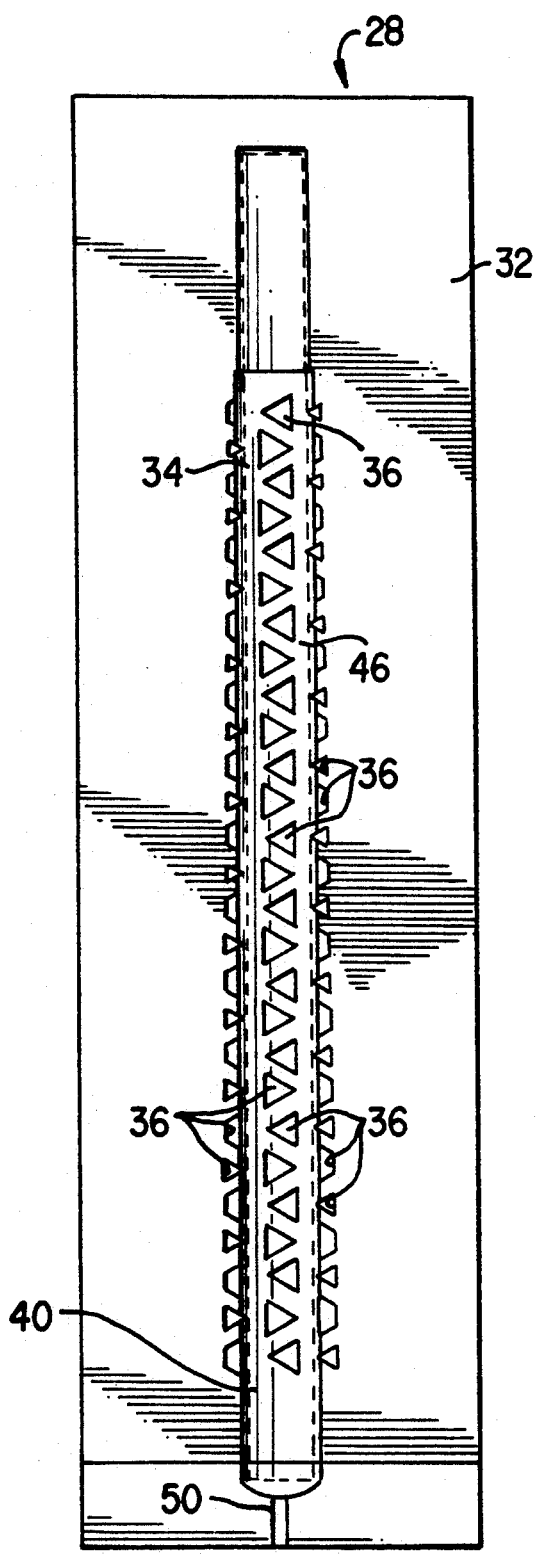
FIG. 2 is an elevational view of one half of a first die, shown in isolation.

FIGS. 2 through 5 and 8 best illustrate the method of manufacturing the golf club grip 10 in quantities. According to the method of invention a pair of identical first and second steel mounting cores, indicated respectively at 24 and 26 in FIG. 8, are utilized with first and second dies, indicated respectively at 28 and 30 in FIG. 8. The die 28 is constructed of P-20, which is a type of tool steel having two mirror image halves 32 and 32' which part along a vertical plane. One of the die halves 32 is illustrated in elevation FIGS. and 3. The die 28 has mold surfaces 34 which are curved concavely and which have a plurality of triangular shaped indentations 36 therein, as illustrated in FIG. 2.

The second die 30 is likewise formed of a pair of upright, mating, mirror image, P-20 steel die sections 38 and 38' which part along a vertical plane. The first die 28 encompasses a volume smaller than does the second die 30. The die cavity of the first die 28 is indicated generally at 40 in FIG. 2, while the die cavity of the second die 30 is indicated generally at 42 in FIG. 5. The die sections 38 and 38' defining the cavity 42 of the second die 30 have concave, smooth walled mold surfaces 44. In contrast, the curved mold surfaces 46 of the die sections 32 and 32' of the die 28 have triangular shaped indentations 36 therein.

To produce golf club grips 10 according to the invention the first and second mounting cores 24 and 26 are both oriented vertically and are carried at opposite ends of a horizontally disposed overhead support 47, as illustrated in FIG. 8. The support 47 is rotatable about a vertical axle 48 that is located centrally between the first mold 28 and the second mold 30. When the mold halves 32 and 32' of the first mold 28 and the mold halves 38 and 38' of the second mold 30 are drawn apart from each other as shown in FIG. 8, the support 47 can be rotated one hundred eighty degrees. In this way the first and second mounting or support cores 24 and 26 can be moved alternatingly and cyclically between the dies 28 and 30.

The dies 28 and 30 are provided with conventional, internal ducting (not shown) which conducts cooling water throughout the mold sections 32, 32' and 38, 38' to cool the component parts of the golf club grips 10 as they are formed within the die cavities 40 and 42. Also, each of the mounting cores 24 and 26 is provided with conventional, internal passageways through which cooling water is circulated and with a conventional, central, axial passageway which is utilized to conduct air under pressure. The central axial passageway of each mounting core terminates at an orifice 52, within which is positioned a one way pressure valve (not visible). This valve allows air under pressure to emanate from the orifice 52 when a source of pressurized air is connected to the axial duct in the mounting core.

In the manufacturing process the dies 28 and 30 are first concurrently opened so that the die sections 32 and 38 are respectively separated from their mating die sections 32' and 38' by a distance greater than the length of the overhead support 47, as shown in FIG. 8. The first mounting core 24 is then rotated by the support 47 into position in the first die 28 between the mold sections 32 and 32', while the second mounting core 26 is concurrently rotated by the support 47 into position between the mold sections 38 and 38' of the second die 30. The first and second dies and 28 and 30 are then concurrently closed.

The first mounting core 24 is thereupon held within the mold cavity 46 of the first die 28 as illustrated in FIG. 3 and extends upwardly and emanates from the mating sections 32 and 32' of the first die 28. A charge of a first material, for example a thermoplastic rubber resin designed to produce a thermoplastic rubber of a predetermined stiffness characteristic, is injected in molten form through the mold gate 50 into the first die 28. The first thermoplastic rubber resin is preferably a material, which is sold under the trade designation Kraton 2705 or Krayton 2706 by GLS Plastics, located in Chicago, Illinois. The first thermoplastic rubber resin is injected into the first mold cavity 40 at a temperature of about 400 degrees Fahrenheit and at a pressure of about 13,000 pounds per square inch.

The first die 28 is then cooled by means of cooling water in the die sections 32 and 32' and cooling water in the mounting core 24 to congeal the first thermoplastic rubber resin to form the socket 12. The durometer hardness of the socket 12 produced from Kraton 2705 resin is about 55. The first die 28 is thereupon opened and the first mounting core 24 is removed therefrom with the socket 12 formed thereon as depicted in FIG. 3. The second die 30 is concurrently opened along with the first die 28. The dies 28 and 30 are opened and closed in tandem and the respective mold sections thereof are depicted in the open position in FIG. 8.

Once the first die 28 has been opened, as illustrated in FIGS. 3 and 8, the first mounting core 24 is removed therefrom carrying the socket 12 molded thereon. This is done by rotating the overhead support 47 one hundred eighty degrees from the position of FIG. 8. Since the second die 30 is concurrently opened with the first die 28, the first mounting core 24 is thereupon brought into registration with the second die 30, as depicted in FIG. 5. The dies 28 and 30 are then closed, thus causing the first mounting core 24 carrying the socket 12 thereon to be inserted into the mold cavity 42 of the second die 30. As the dies sections 38 and 38' are brought together, their smooth, curved surfaces 44 are brought to bear against the outwardly facing surfaces 22 of the projections 20 of the socket 12. The surfaces 44 of the mold sections 38 and 38' are thereby pressed against the surfaces 22.

A charge of a second material, for example a second thermoplastic rubber resin designed to produce a thermoplastic rubber of a predetermined stiffness characteristic different than that of the first thermoplastic rubber resin, is thereupon injected into the second die 30 through the gate 50 thereof. The second thermoplastic rubber resin is preferably a material which is sold under the trade designation J-VON 3000-45 by Polymerland of Dallas, Texas. The charge of the second thermoplastic rubber resin is injected into the second mold cavity 42 at a temperature of about 340 degrees Fahrenheit and a pressure of about 6,000 pounds per square inch.

This second molten charge flows up between the projections 20 and about the socket 12 which remains on the first mounting core 24 in the second die 30. The second die 30 is then cooled with the cooling water in the die sections 38 and 38' and in the mounting core 24 to congeal the second thermoplastic rubber resin which is thereupon formed into a jacket 14, as depicted in FIG. 6. The jacket 14 produced by the J-VON 3000-45 resin has a durometer hardness of about 45. As illustrated in FIGS. 5, 6 and 7, a golf club grip 10 is thereby formed by molding with a jacket 14 bonded to a socket 12.

The second die 30 is then opened by drawing the die sections 38 and 38' apart and the golf club grip 10 is ejected from the first mounting core 24. Ejection is performed by introducing a charge of air under pressure into the central axial duct in the first mounting core 24. The pressurized air, acting through the orifice 52, forces the finished golf club grip 10 downwardly and off of the first mounting core 24, as illustrated in FIG. 5.

Since the first die 28 has mold surfaces 46 with a plurality of radial indentations 36 therein, cooling of the first die 28 produces a socket 12 with a socket core 18 having a plurality of radially directed protrusions 20 thereon. Once the socket 12 has been formed and the mounting core upon which it has been formed is rotated into position between the mold sections 38 and 38' of the second die 30, these mold sections are closed. When the second die 30 is closed the outwardly facing triangular shaped surfaces 22 of the protrusions 20 on the socket core 18 contact the smooth walled mold surfaces 44 of the second die 30. The protrusions 20 which are produced on the socket core 18 correspond to the indentations 36 in the first die 28. When the second charge of thermoplastic rubber resin is introduced into the mold cavity 42 of the second die 30, the molten resin flows up and through the channels defined between the protrusions 20, but it does not contact the outer surfaces 22 of the protrusions 20, since these surfaces 22 are pressed tightly against the smooth walled molding surfaces 44 of the second mold cavity 42.

As previously indicated, the two dies 28 and 30 are operated in tandem, and the two mounting cores 24 and 26 are alternatingly and cyclically positioned sequentially in each of the first and second dies 28 and 30. Specifically, the second mounting core 26 is positioned in the first die 28 while the first mounting core 24 carrying the socket 12 thereon is concurrently inserted into the second die 30. The first and second dies 28 and 30 are opened and closed concurrently throughout the cyclical molding operation. The first die 28 is injected with a molten charge of the first resin while the second die 30 is concurrently injected with a molten charge of the second resin. The first die 28 is cooled concurrently with cooling of the second die 30. As a result, when the jacket 14 is formed and bonded onto the socket 12 on the first mounting core 24 as depicted in FIGS. 5 and 6, a subsequent socket 12 is concurrently being produced on the second mounting core 26 in the first mold 28.

The second mounting core 26 carrying the subsequent socket 12 thereon is moved from the first die 28 to the second die 30 by rotating the overhead support 47 one hundred eighty degrees to the position of FIG. 8. This is done after the finished golf club grip 10 is ejected from the first mounting core 24. The first mounting core 24 is concurrently moved back to the first die 28, to the position depicted in FIG. 8, while the second mounting core 26 is moved into the second die 30. The dies are closed and a another molten charge of the first resin is injected into the first die 28 while another molten charge of the second resin is concurrently injected into the second die 30 while the second mounting core 26 resides therein. The first die 28 and the second die 30 are cooled concurrently. As a result, a subsequent socket 12 is produced in the first die 30 each time that a jacket 14 is molded onto a previously formed socket 12 in the second die 30. The cycle time within which a new golf club grip 10 is formed is between about 40 and 50 seconds. Therefore, the molding machinery depicted forms about 90 new golf club grips per hour.

A very significant feature of the invention is that the mutually contacting surfaces of the socket 12 and jacket 14 of each golf club grip 10 are cross linked and bonded to each other throughout. As a result, torsional force as indicated by the directional arrow 16 in FIG. 7 which is applied to the outer surface of the jacket 14 is fully transmitted to the socket 12 and acts on both the protrusions 20 and the inner socket core 18. The first solidified thermoplastic rubber forming the socket 12 which is produced from the first thermoplastic rubber resin is preferably stiffer than the solidified thermoplastic rubber of the jacket 14 that is produced by the second thermoplastic rubber resin. Preferably, the thermoplastic rubber of the socket 12 has a durometer hardness of between about 45 and about 65 and the durometer hardness of the thermoplastic rubber forming the jacket 14 is preferably between about 35 and 55. In the finished golf club grip, therefore, both the socket core 18 and the radial protrusions 20 of the socket 12 serve to enhance the stiffness of the golf club grip 10.

Torsional force acting on the outer surface of the golf club grip 10 is indicated by the tangential directional arrow 16 in FIG. 7. Although the material forming the jacket 14 is softer and less stiff than the material of the socket 12, the jacket 14 is stiffened by the presence of the protrusions 20 which are spaced periodically throughout the surface of the socket core 18. The protrusions 20 thereby serve as stiffening elements to retard the extent of elastic deformation of the thermoplastic rubber material forming the jacket 14 because that material can only deform a certain amount before it is stiffened by the resistance to further deformation by the radial protrusions 20.

A further feature of the golf club grip 10 is that when a golfer grasps the grip 10 and squeezes it, the structure of the jacket 14 between the protrusions 20 is compressed radially inwardly to a greater extent than are the protrusions 20. As a consequence, when radial inward pressure from the golfer's hands is exerted on the structure of the jacket 14 surrounding the radial protrusions 20 of the sockets 12, the radial pressure at the interface between the golfer's skin and the surfaces 22 of the protrusions 20 is enhanced. This enhances the frictional force resisting torsional movement of the golfer's hands relative to the protrusions 20 even though the coefficient of friction therebetween is less than the coefficient of friction between the golfer's hands and the structure of the jacket 14. As a result, torsional forces exerted by the golfer's hands, indicated by the directional arrow 16 are transmitted more completely radially inwardly through the structure of the golf club grip 10 than is the case with conventional golf club grips.

The material forming the socket 12 and the material forming the jacket 14 preferably differ in color. Because the distinctive coloring exists throughout the component molded parts of the golf club grip 10, any surface wear on the protrusions 20 will have no effect on the distinctive coloring of the surfaces 22 which are surrounded by the structure of the jacket 14. The color of the protrusions 20 does not fade with use or exposure, as does the color of designs on conventional golf club grips which are painted only onto the outer surface of the grip. Rather, the color of the protrusions 20 will remain deep and vibrant, and will not fade throughout the useful life of the golf club grip 10.

While the preferred embodiment of the golf club grip of the invention as described employs an inner socket which is formed of a material stiffer than the jacket 14 molded thereon, if desired for any reason the jacket 14 can be formed of a material that is stiffer than the socket 12. Such a golf club grip might have a thin shell of a stiff, hard material formed over an inner socket of a softer more shock absorbent material. In such an embodiment torsional surface tension on the shell or jacket is distributed uniformly to the underlying, softer socket.

Also, it should be understood that while a socket having radial protrusions of the type described is preferred, a golf club grip can be constructed according to the invention in which the jacket is molded completely over the entire outer surface of the socket, so that no portion of the socket is visible when the golf club grip is mounted on a golf club shaft. In such an embodiment a very thin relatively soft outer layer can be provided for enhancing traction and the inner socket can be formed of a stiffer material.

Undoubtedly, numerous other variations and modifications of the invention will become readily apparent to those familiar with the design and fabrication of golf club grips. Accordingly, the scope of the invention should not be construed as limited to the specific embodiment and the manner of implementation described herein, but rather is defined in the claims appended hereto.

I claim:

1. A golf club grip comprised of a hollow, inner socket formed of an elastomeric thermoplastic material having a predetermined stiffness characteristic and an outer jacket of an elastomeric thermoplastic material having a predetermined stiffness characteristic different than that of said socket, said jacket being molded onto an outer surface of said socket and physically cross-linked and bonded directly thereto by molding throughout the surfaces of contact between said outer jacket and said inner socket such that torsional stress on said jacket is uniformly transmitted directly to and resisted by said inner socket.

2. A golf club grip according to claim 1 wherein said socket is molded and said jacket is molded onto said socket.

3. A golf club grip according to claim 1 wherein said socket is molded with an inner socket core portion from which a plurality of protrusions project outwardly and terminate at outermost surfaces, and said jacket is molded onto said socket such that the structure of said jacket covers and is bonded to said inner socket core portion and laterally surrounds and is bonded to said protrusions, whereby said outermost surfaces of said protrusions lie exposed.

4. A golf club grip according to claim 3 wherein said socket and said jacket are of colors which differ from each other.

5. A golf club grip according to claim 1 wherein said material of said socket is stiffer than said material of said jacket.

6. A golf club grip according to claim 1 wherein said material of said jacket is stiffer than said material of said socket.

7. A golf club grip according to claim 1 wherein each of said materials forming said socket and said jacket is a thermoplastic rubber.

8. A golf club grip comprised of a hollow, inner, elastomeric thermoplastic molded socket having an inner socket core portion from which an outwardly projecting portion protrudes and terminates in an outermost surface, and an outer elastomeric thermoplastic jacket formed of a material having a stiffness characteristic different than that of said socket and molded onto said socket and physically cross-linked and bonded directly thereto by molding throughout the surfaces of contact between said outer jacket and said inner socket such that torsional stress on said jacket is uniformly transmitted directly to and resisted by said inner socket, said jacket, completely covering said inner core portion and exposing said outermost surface of said outwardly projecting portion.

9. A golf club grip according to claim 8 wherein said socket and said jacket are formed in colors which differ from each other.

10. A golf club grip according to claim 8 wherein said socket and said jacket are both comprised of thermoplastic rubber.

* * * * *